(No Model.)
J. J. ENDRES.
CAR BRAKE.
No. 374,044. Patented Nov. 29, 1887.
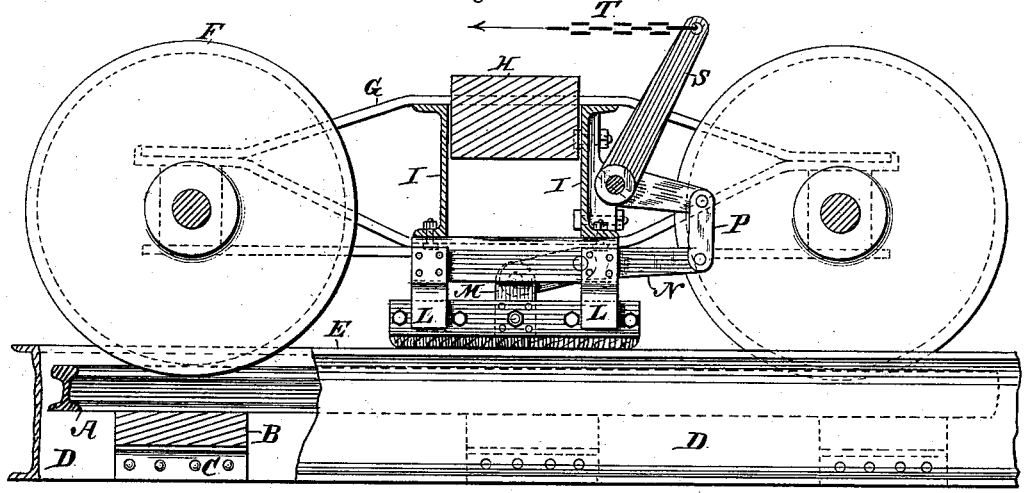
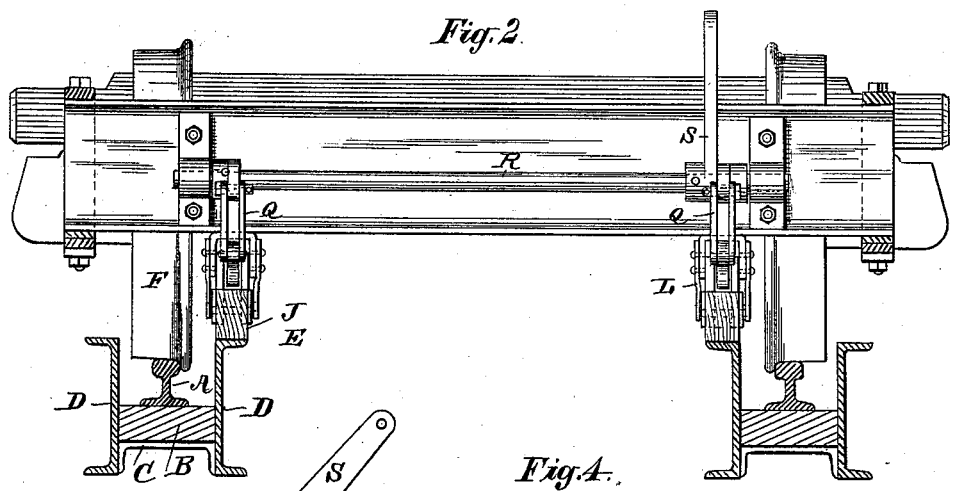
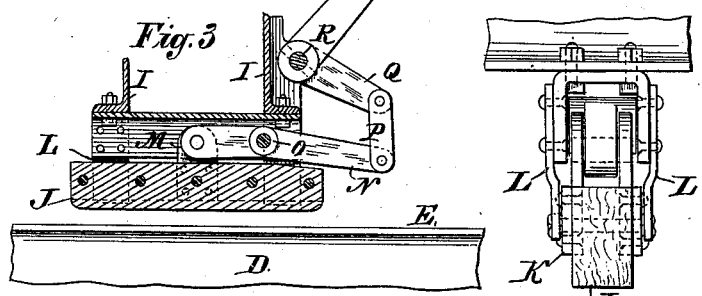
Witnesses:
Henry Eichling
R. F. Gunford
Inventor
John J. Endres.
N. PETERS, Photo-Lithographer, Washington, D. C.

UNITED STATES PATENT OFFICE.

JOHN J. ENDRES, OF NEW YORK, N. Y.

CAR-BRAKE.

SPECIFICATION forming part of Letters Patent No. 374,044, dated November 29, 1887.

Application filed February 12, 1886. Serial No. 191,682. (No model.)

*To all whom it may concern:*

Be it known that I, JOHN J. ENDRES, of the city, county, and State of New York, have invented certain new and useful Improvements in Car-Brakes, of which the following is a full, clear, and exact description.

The invention relates to auxiliary mechanism for braking cars and for preventing them leaving the track, and particularly does it relate to such mechanism as used on cars designed to run on elevated structures having steep grades.

The objects of the invention are to provide, first, braking devices other than the common braking mechanism, which devices are arranged to be brought into operation when the brakes commonly used fail, such auxiliary brake having great power and being intended for use only in dangerous emergencies, and also to provide, in combination with the said auxiliary braking devices, means for preventing derailment of the car-wheels.

The invention consists in providing the cars with long braking-shoes, which have suitable working connections extending to within operative reach of the conductor of the car, there being also braking and guarding rails arranged close to and parallel with the track-rails, and just beneath said shoes, which guard-rails constitute the surfaces upon which the shoes are applied to effect the braking of the car, as also a guard to keep the car-wheels upon the track.

Referring to the drawings, Figure 1 is a central longitudinal section of a car-truck provided with my improved auxiliary braking mechanism, and showing also the braking and guard rails of an elevated structure. Fig. 2 is an end elevation view of the truck, showing the truck structure in cross-section. Fig. 3 is a central longitudinal section of one of the braking-shoes, and Fig. 4 is an end view of one of the braking-shoes.

In the views, A represents the track-rails of the structure, which rest upon blocks B, supported on braces C between the bars D, these united bars constituting stringers for supporting the track-rails. They also act as guards to prevent the wheels of the trucks from derailment, or if the wheels do leave their rails they prevent them and the cars from leaving the structure. The upper part of these bars is formed into a broad flat face, E, which serves as a suitable surface upon which to brake the cars.

F represents the wheels of the car-truck, G the frame, and H the cross-bar on which one end of the body of the car is supported, this bar being arranged between the bars I of the truck-frame upon suitably-placed springs.

J indicates the braking-shoes, which consist of wood or any other like suitable material faced with side plates, K, and moving vertically between guides L, secured to cross-bars I. To these shoes is pivoted, by ears M, one end of the lever N, which has its fulcrum at O, and is connected at its outer end by link P to the arm Q, which is fixed to the crank-shaft R, this shaft being provided with a crank-arm, S, to which is attached a connection, T, running to a hand-wheel or like device located on the car-body, so as to be under the control of the conductor.

These means constitute a powerful auxiliary braking mechanism, which can be brought into quick and effective use whenever the common braking devices become inoperative or inefficient. It will be also seen that braking thus on specially-provided surfaces and surfaces that are independent of the track-rails results in a further protection in that the weight of the car-body can be largely, if not in fact wholly, thrown upon such braking-surfaces, as in the case of a broken wheel or where a wheel jumps its rail.

Still other advantages are inherent in this form of braking device, particularly those of simplicity and cheapness in construction; and in this connection the utility and necessity of the braking-rail serving as a guard-rail will be apparent. Its position close to the face of the wheels is important, as is also its combined functions of serving as a braking-surface and a guard to the wheels.

What I claim as new is—

1. In combination, the rail D, arranged close to the track-rails so as to serve as a guard to the truck-wheels, and provided with a braking-surface, E, a braking-shoe, J, borne on the car-truck, and mechanism also borne on said truck and adapted to forcing said shoe upon said rail, as and for the purpose set forth.

2. In combination with the guard-rail D, arranged close to the track-rail, as described, and provided with the braking-surface E, the shoes J, the levers N and links P, and the crank-shaft R, substantially as and for the purpose set forth.

JOHN J. ENDRES.

Witnesses:
HENRY EICHLING,
ROBERT JACKSON.